Patented May 4, 1954

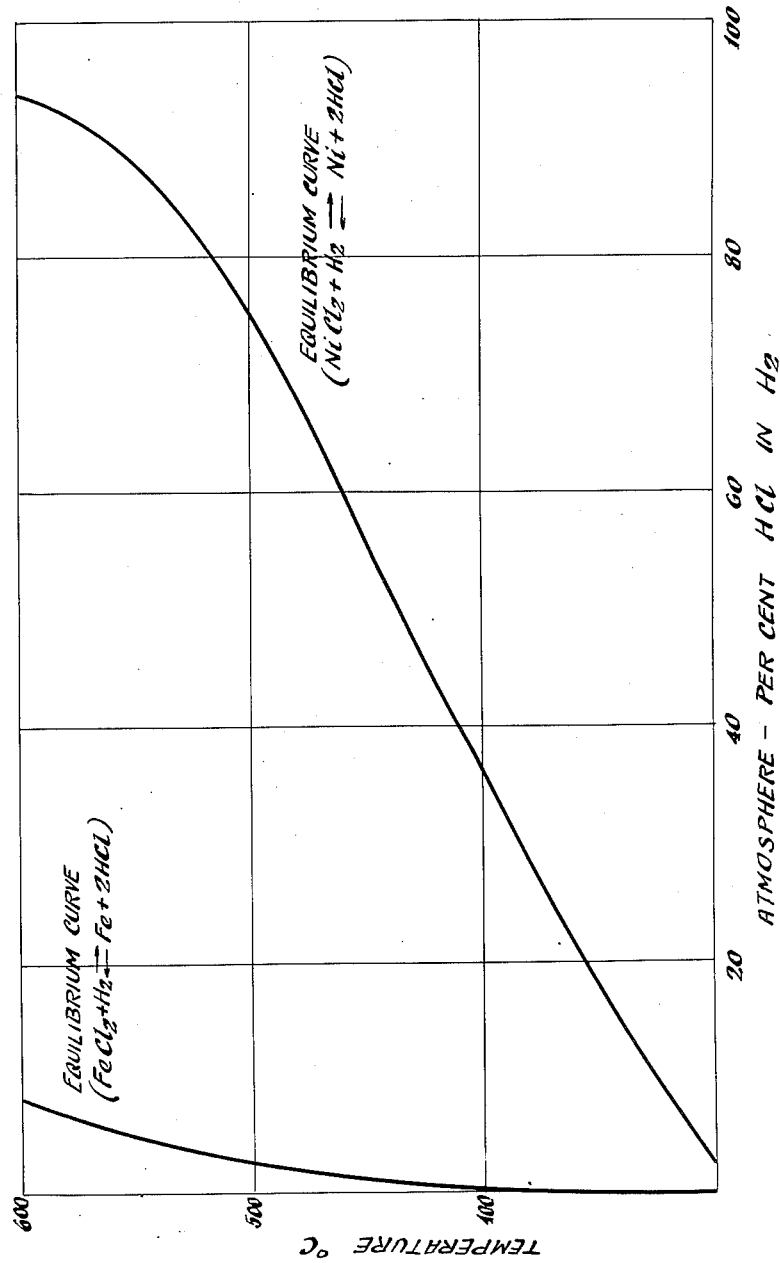

2,677,607

UNITED STATES PATENT OFFICE 2,677,607

PROCESS OF SELECTIVELY REDUCING NICKEL CHLORIDE FROM A MIXTURE CONTAINING NICKEL AND IRON CHLORIDES TO PRODUCE NICKEL

Marion Ernest Graham, Parma, and Edward A. Beidler, Columbus, Ohio, assignors, by mesne assignments, to Republic Steel Corporation, Cleveland, Ohio, a corporation of New Jersey Application October 24, 1950, Serial No. 191,842

2 Claims. (Cl. 75—0.5)

The present invention relates to a process of selectively reducing nickel chloride from a mixture containing commercial nickel and iron chlorides to produce pure commercial nickel. More particularly, the invention relates to the selective reduction of nickel chloride to produce substantially pure nickel, while preventing any substantial reduction of the iron chloride, the reduction taking place by the use of a reducing gas with the chlorides maintained in a solid phase, and the essential active reducing ingredient of the reducing gas being hydrogen.

Certain ores found at various parts of the world, of which "Nicaro" and other lateritic ores are examples, contain both iron and nickel along with some other metals or metal compounds, and gangue. It has been suggested, in the recovery of the metal values from these ores, to subject them to some chloridizing treatment which will convert the iron and nickel constituents thereof to ferrous chloride and nickel chloride respectively. Mixtures of these chlorides may also be arrived at or produced in other ways, all of which form per se no part of the present invention. The problem to which the present invention pertains is in the separation of the iron and nickel, particularly by separating the nickel from such a starting material, the essential ingredients of which are nickel chloride (NiCl$_2$) and ferrous chloride (FeCl$_2$).

It has been known for some time that ferrous chloride may be reduced by treating it in the solid phase by the use of hydrogen at temperatures substantially above atmospheric to produce metallic iron. It has similarly been known for some time that nickel chloride may be similarly reduced by hydrogen to form nickel. These reactions may be expressed chemically by the following equations:

$$FeCl_2 + H_2 = Fe + 2HCl$$
$$NiCl_2 + H_2 = Ni + 2HCl$$

Based upon known mass action principles, and considering that HCl is one of the reaction products, according to both the equations given above, it may be expected that if the reducing gas had HCl intermixed therewith initially, or if the HCl concentration in the gas were permitted to build up in the ambient atmosphere due to one or both the reactions above, these reactions would be retarded. This is found to be true. It has been discovered, however, that the retardation of these reactions by the presence of HCl is selective in character, so that while a given amount of HCl will retard both reactions somewhat, the retardation is selectively effective. This novel principle is made use of in and forms the basis of the present process.

In the course of the research by which the present process was developed, there was found to be a definite concentration of HCl in equilibrium with ferrous chloride and a given concentration of hydrogen for a given temperature in an operative range. This amount of HCl actually increased with a rise in temperature, but for any particular temperature, was a definite concentration. Similar data was obtained as to nickel. These concentrations of HCl in gaseous mixtures consisting of HCl and hydrogen, which are in equilibrium respectively with the hydrogen present and FeCl$_2$ on the one hand, and with the hydrogen present and NiCl$_2$ on the other, can be plotted on a single chart, using HCl concentration as one variable and temperature as the other. Such a chart is reproduced in connection with this application and is submitted herewith as a single figure of the drawings, as hereinafter set forth. From this chart it will be seen that there is an intermediate range of concentrations of HCl for any given temperature, greater than that representing the equilibrium concentration in respect to FeCl$_2$ and yet less than that representing the equilibrium concentration in respect to NiCl$_2$. Using some concentration in this intermediate range, it has been found, in accordance with the present invention, that the reduction of FeCl$_2$ is substantially wholly prevented, while the reduction of NiCl$_2$ to nickel is retarded somewhat as the concentration of HCl present approaches the maximum or equilibrium concentration of HCl in respect to NiCl$_2$, but this reduction of nickel is not wholly prevented and will proceed at a commercially satisfactory rate and to a desired extent at which substantially more than half the nickel chloride initially present will be reduced to elemental nickel.

Turning now to a consideration of the equilibrium relations for the two equations given above, it will be seen that the equilibrium relation as to iron may be expressed as follows:

$$k_{Fe} = \frac{(HCl)^2}{(H_2)}$$

while that as to nickel may be expressed as follows:

$$k_{Ni} = \frac{(HCl)^2}{(H_2)}$$

In each case $k$ represents the equilibrium constant for iron and nickel respectively as denoted by the sub-script symbol. In each case, the equilibrium constant is determined by dividing the square of the concentration of HCl by the concentration of hydrogen. If these $k$ values were plotted in a way similar to the plot of HCl concentration discussed above, it would be found that the $k$ for iron is less than the $k$ for nickel at any given temperature; and that each $k$ value varies with temperature. It is also known that these values of $k$ for iron and nickel respectively, are each independent of the presence of diluent gases, such as nitrogen.

In order that the reduction of iron from ferrous chloride be prevented, it is necessary that there be an HCl concentration in respect to the concentration of hydrogen such that the square of the concentration of HCl divided by a concentration of hydrogen shall exceed the $k$ value or equilibrium relation of the equation:

$$FeCl_2 + H_2 = Fe + 2HCl$$

Similarly, in order that nickel be reduced from nickel chloride to elemental nickel, it is necessary that the square of the HCl concentration divided by the hydrogen concentration shall be less than the $k$ value for nickel or the equilibrium relation of the equation:

$$NiCl_2 + H_2 = Ni + 2HCl$$

The present invention contemplates the use of HCl concentrations in relation to hydrogen concentration in this intermediate range.

The present invention, therefore, may be summarized as a process wherein a solid mixture, the essential active ingredients of which are commercial nickel and iron chlorides, is treated at a desired temperature, which has been found to be in the range of about 450° C. to about 650° C. i. e. about the melting point of $FeCl_2$, by a gaseous mixture, the essential active ingredients of which consist of hydrogen and HCl.

The gaseous mixture in the reducing zone is maintained as to its concentration of HCl and hydrogen, such that the square of the concentration of HCl therein divided by the concentration of hydrogen is such as to exceed $k_{Fe}$ as above defined, i. e., the value of the ratio which represents the equilibrium relation of the equation:

$$FeCl_2 + H_2 = Fe + 2HCl$$

and is such as to be less than $k_{Ni}$ as above defined, i. e., the value of the ratio which represents the equilibrium relation of the equation:

$$NiCl_2 + H_2 = Ni + 2HCl$$

both at the temperature in the range aforesaid at which all the materials in the reducing zone are maintained. Preferably the actual value of $$\frac{(HCl)^2}{(H_2)}$$

only slightly exceeds $k_{Fe}$ as at this point or range the reduction of iron is positively prevented while the retardation of the reduction of the nickel is minimized.

Considering now the details of the process and the specific requirements for each of the different steps and portions thereof, the first thing to be considered is the raw material. This material may be any suitable and available solid material having a content of nickel chloride and iron chloride, which it is desired to separate to produce substantially pure elemental or metallic nickel. There may be more or less gangue present in the raw material such as would be found in most natural ores. There may also be various solid elements, or compounds of other metals present which do not react under the conditions present in this process and hence are not active ingredients.

Many natural materials, ores and the like, which contain nickel in a sufficient amount to warrant the practice of the present process being operated commercially for the recovery of nickel, also contain some relatively smaller amounts of cobalt. It is well known that cobalt acts similarly to nickel from a chemical point of view in many reactions involving these metals. As a result most commercial nickel contains a small quantity of cobalt and many commercial nickel compounds have intermixed therewith the respectively similar compounds of cobalt. When commercial nickel chloride and commercial nickel are referred to herein, these terms are intended to include respectively some cobalt chloride and metallic cobalt, in amounts such as may be reasonably expected in many, if not most, such materials as manufactured, supplied and used commercially.

The material is preferably suitably comminuted, in any desired way and by any desired mechanism to some small particle size such that a reasonably intimate gas-to-solid contact is afforded. The particle size is not critical, in accordance with the present invention, but the general principle should be set forth that smaller particle size material affords better gas-to-solid contact in most instances; while larger particles might react on the surface, but would result in much unreacted material at the center portions of the particles. It is contemplated, for example, that material in the order of about 30 to about 100-mesh would be suitable, in accordance with the present process. These values are given as examples and are not intended to exclude particles larger or smaller than this range.

The reaction may take place between the solid material and the gas in any suitable place or reducing zone as it may be called. This zone may be provided, for example, either in a suitable container on a batch basis, or continuously as within a rotary kiln type furnace, or in some other way known to those skilled in the art, wherein a gas-to-solid type reaction may take place. Normally, it is preferred that some agitation of the solid material be provided, so that all of it will have an opportunity to react with the gas.

As the reaction is to take place at a temperature substantially above atmospheric, some means must be provided for bringing the material to this reaction temperature and/or maintaining it at such temperature during reaction period. Again, any suitable means available for this purpose may be employed, the particular means used forming per se no part of the present invention. Here again it may be suggested that a suitable rotary kiln may be satisfactorily employed for the purpose. The rotating body of such a kiln may be located within a suitable furnace, by which the temperature of the kiln and its contents may be maintained at a desired point or within a desired range. The reaction to be carried on is endothermic in character, so that sufficient heat must be supplied to maintain the temperatures desired, while supplying the necessary heat for the reaction itself. Inasmuch as the present process may be carried on in many different known types of mechanisms, which are identified in the present case as a reaction or reducing zone, no particular description will be given thereof.

The gases supplied to and through the reaction zone must contain both a reducing gas, which in the present instance is hydrogen, and sufficient HCl in proportion to the hydrogen present as aforesaid to prevent the reduction of ferrous chloride, while permitting the reduction of nickel chloride. In accordance with the present invention, the gaseous mixture supplied to and through the reaction zone may consist essentially of these two gases, hydrogen and HCl, that is, these are substantially the sole constituents of the gaseous mixture. It is intended, however, that the term "consist essentially," or equivalent terms, shall be construed so as to cover a gaseous mixture containing some small and/or negligible amounts of one or more other gases, which do not affect the reactions taking place, for example, small amounts of some neutral gas as nitrogen.

From a broader point of view, while the gaseous mixture must contain HCl and hydrogen as its active ingredients, it may also contain more or less of one or more inactive ingredients, nitrogen again being an example of such an inactive ingredient. In this connection, the words "the essential active ingredients consisting of" are used, meaning that the HCl and hydrogen are both present as active ingredients and are the only ingredients present which are either active or essential. At the same time, there may be any amount or proportion of one or more inactive ingredients present, so long as the final desired result is attainable.

In order that the reduction of ferrous chloride be substantially completely prevented, there must always be present in the gaseous mixture at least that amount of HCl corresponding to the equilibrium relation of the equation:

$$FeCl_2 + H_2 = Fe + 2HCl$$

In other words, the square of the concentration of HCl, divided by the concentration of hydrogen must give a value exceeding $k_{Fe}$ as above defined. While it is recognized that this concentration varies somewhat with temperature as is evidenced from the single figure of the drawings, for a given temperature at which the reaction is to take place, this minimum concentration of HCl in respect to the hydrogen concentration is a definite amount.

Further, from the two equations given above, and particularly that for the reduction of nickel, which represents the sole reaction actually occurring in accordance with the present invention, it will be obvious that HCl is produced in the process and that hydrogen is used up. As a result, gas, which has been in the reaction zone in contact with the solid material supplied thereto and the composition of which has not been stabilized or maintained by the admission of gas of suitable composition, will have an HCl concentration substantially greater than that of the entering gas. The HCl concentration can never build up to the point where it will wholly stop the reduction of nickel or exceed the ratio in respect to the hydrogen remaining, corresponding to $k_{Ni}$ as aforesaid for the reason that the reduction of nickel becomes progressively slower as the ratio of HCl to hydrogen, calculated as aforesaid, approaches the values $k_{Ni}$ at the temperature being used.

While as stated above, any HCl concentration lying between the two curves on the drawings may be employed in accordance with the process, the preferred initial concentration of the gas is above but closely adjacent to or approximating the concentration which is in equilibrium with ferrous chloride, i. e., the relation represented by 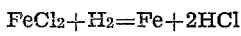 $k_{Fe}$ as defined above. The reason for this is that, from mass action principles, any HCl present in the gases tends to retard the reduction reaction for nickel. As such, it is to be expected and has in fact been found that the more HCl is present, the greater is this retarding influence. It is preferred, therefore, to minimize the retarding influence as to nickel, while maintaining a sufficient HCl concentration in respect to hydrogen to prevent the reduction of iron.

It is also preferred that the HCl concentration be not allowed to build up to any higher point than necessary in respect to the hydrogen concentration. In a batch operation, this may be accomplished by initially supplying to the reaction zone in contact with the solid material therein as aforesaid, a gaseous mixture having desired concentrations of HCl and hydrogen in accordance with the principles set forth above. After the reaction has progressed to some extent, causing an increase in HCl concentration and a decrease in hydrogen concentration, the gaseous atmosphere in the reaction zone may have added thereto a gas relatively rich in hydrogen and containing little or no HCl. In this way the concentrations of HCl and hydrogen in the gases in the reaction zone in contact with the solid materials therein may have the essential concentrations maintained within a desired range.

Another way of maintaining desired concentrations of HCl and hydrogen in the gaseous atmosphere in contact with the solid materials in the reaction or reducing zone is substantially continuously to supply to this zone a gaseous mixture having the desired concentrations of HCl and hydrogen, and simultaneously to withdraw gases from the reaction zone. Such withdrawn gases may have their HCl and/or hydrogen concentrations suitably adjusted and then be recirculated through the reaction or reducing zone if desired. This manner of operation is applicable both to batch and continuous operations (as to the solid materials).

While it is contemplated that the gaseous pressures in the reducing zone will usually be little above atmospheric pressures, the reaction may be carried on both above and below such pressures. It has been found that relatively lower pressures for the total of the partial pressures of HCl and hydrogen in the gaseous mixture give better results than when this total is higher. As such, therefore, it is usually preferred that this total not exceed about one atmosphere. On the other hand, these partial pressures must be sufficient so that the desired reaction will proceed at a reasonable practicable rate. The lower limit of this total of the partial pressures of HCl and hydrogen is thus dictated by economics, rather than by the chemical principles involved.

In order that the reaction temperature be maintained at a desired point, it is usually preferred that the entering gaseous mixture be raised to a desired temperature, substantially the desired temperature for the reaction, prior to introducing this gaseous mixture into the reducing zone. For this purpose the gaseous mixture may be heated by any desired type of mechanism or device usable for that purpose and its temperature controlled in any way known to the art.

When some equipment is employed in which the solid materials are continuously or intermittently moved during the process, the reduction reaction may take place with the gas moving concurrently with the solid material or countercurrent thereto as may be desired, although the latter is usually preferred. The present process is not limited in either respect as to the direction of gas flow, but includes both and also includes, for example, a situation wherein the solid material is not moved, but is supplied to and removed from the reaction or reducing zone on a batch basis.

The temperature limits given for the reaction in this case represent generally practical limits. The reasons for these limits are as follows: Below about 450° C., the rate of reaction is so slow that the process becomes essentially non-commercial. It is intended that the lower limit be placed at any point in the temperature scale at which the reaction will proceed at a satisfactory rate, that temperature chosen (450° C.) being what is presently believed to be about the lowest temperature at which commercial operation is practicable. This lower limit of temperature is not critical except from the economical and practical point of view.

The upper limit of temperature (about 650° C.) is chosen at a point where all the materials expected to be present will remain in substantially their solid states respectively. It is recognized, for example, that the melting point of $FeCl_2$ is about 674° C. However, as ferrous chloride approaches its melting point, it tends to become somewhat tacky and tends to agglomerate or agglutinate. This action is usually undesired, as it tends to prevent adequate gas-to-solid contact with any unreacted nickel chloride present. The upper limit of temperature, therefore, is critical only to the extent that it represents the temperature at which the normally solid materials remain in a solid state and at which such materials do not agglomerate so as substantially to prevent contact between hydrogen and nickel chloride. The temperature limit of about 650° C. is given as a practical numerical value representing this upper limit as particularly defined herein.

Examples of the actual operations of the process are as follows:

*Example I.*—150 grams of a mixture, containing iron chloride and nickel chloride in the weight ratio of 30:1 (this ratio of iron to nickel corresponds to the ratio of iron to nickel found in Nicaro ore) was placed in a rotary kiln and contacted with a gas consisting of 28.5% by volume HCl with the balance hydrogen, for 160 minutes. During this time the contents of the reaction chamber were maintained at a temperature of 450° C. At the end of this time period, it was found that none of the ferrous chloride had been reduced to metallic iron, but that 5.6% of the nickel chloride had been reduced to metallic nickel. Because of the relatively slow rate at which the reduction of nickel chloride to nickel proceeded at this temperature, it is believed that 450° C. is about the lowest temperature which can be economically employed in this process.

*Example II.*—A mixture of the same chloride material, described under Example I, was contacted in the same apparatus with a gaseous mixture, consisting of 5% by volume HCl with the balance hydrogen, for 45 minutes at a temperature of 500° C. During this time, 59.0% of the nickel chloride was reduced to metallic nickel, while the ferrous chloride remained entirely unreduced. It is to be noted that the concentration of HCl in this example, i. e., 5% by volume was only slightly more than the minimum amount of HCl needed (with the balance hydrogen) to prevent the reduction of ferrous chloride, namely, 2.3%.

*Example III.*—As an example of the effects of somewhat higher percentages of HCl in the reducing gas, the same iron-nickel chloride mixture described above, was similarly reacted with a gas consisting of 17.0% HCl by volume, with the balance hydrogen, at a temperature of 500° C. for 80 minutes. At the end of this time it was found that 11.0% of the nickel chloride had been reduced to metallic nickel, while none of the ferrous chloride had been reduced to metallic iron. By comparing this result with Example II, it can be seen that the presence of higher HCl percentages, above the minimum set forth in the single figure of drawings, serves to retard the reduction of nickel chloride, while still preventing the reduction of iron chloride to iron entirely.

*Example IV.*—As a further example of the effects of the presence of amounts of HCl in excess of that required to prevent the reduction of $FeCl_2$, a mixture of the same iron-nickel chlorides of the composition described above, was contacted for a period of 30 minutes and at a temperature of 500° C. with a gas containing 61.0% by volume HCl, with the balance hydrogen. During this time none of the ferrous chloride was reduced to metallic iron, but only 5.5% of the $NiCl_2$ was reduced to metallic nickel.

*Example V.*—At a temperature of 600° C., the same mixture, containing 30 parts of iron chloride to 1 part of nickel chloride, was contacted for a period of 40 minutes with a gas consisting of 76.8% by volume of HCl, with the balance hydrogen. Since this amount of HCl was considerably in excess of the minimum amount required to prevent the reduction of ferrous chloride to metallic iron, i. e., 8.0% by volume, only 30% of the nickel chloride was reduced to nickel during this period, while, of course, the reduction of ferrous chloride to metallic iron was prevented entirely.

When the same iron-nickel chloride material was reacted for the same time and at the same temperature with a gas containing only 25.2% by volume of HCl, with the balance hydrogen, 66% of the nickel chloride was reduced to metallic nickel, while the reduction of ferrous chloride was prevented entirely.

The reduction of nickel chloride to nickel proceeded even more favorably when the volume of HCl was decreased even further. This was demonstrated in a further test in which the same iron-nickel chloride mixture was reacted under the same conditions of time and temperature with a gas consisting of 20% HCl by volume, with the balance hydrogen. There resulted a reduction of 80% of the nickel chloride to metallic nickel, while none of the ferrous chloride was reduced.

*Example VI.*—This example illustrates that with concentrations of HCl only slightly in excess of the minimum required to prevent the reduction of ferrous chloride, the time of reaction necessary to reduce a substantial amount of the nickel chloride to metallic nickel may be appreciably reduced. In this example, the same mixture of iron chloride and nickel chloride was contacted for a period of 20 minutes and at a temperature of 600° C. with a gas consisting of 13.7% of HCl by volume, with the balance hydrogen. During this time 62% of the nickel chloride was reduced to metallic nickel, while the reduction of ferrous chloride to metallic iron was entirely prevented.

While but a limited number of examples of the operation of the process have been given herein, the principles of the process have been set forth in sufficient detail to enable those skilled in art to carry on the process. Equivalents of the process are in part taught herein and in part will be obvious from the present teachings. We do not wish to be limited, therefore, except by the scope of the appended claims, which are to be construed validly as broadly as the state of the prior art permits.

What is claimed is:

1. The process of selectively reducing NiCl₂ from a mixture of finely divided solid materials, the essential active ingredients of which consist of commercial divalent nickel and iron chlorides, to form substantially pure commercial nickel, comprising the steps of introducing said finely divided solid materials into a reducing zone, supplying heat to said reducing zone sufficient to maintain the temperature therein in the range of about 450° C. to about 650° C., substantially continuously introducing into said reducing zone a reducing gas, the essential active ingredients of which consist of hydrogen and hydrogen chloride, controlling the relative amounts of hydrogen and hydrogen chloride in said reducing gas as introduced into said zone as aforesaid so as to provide an adequate amount of hydrogen to effect the reduction of nickel chloride in accordance with the equation:

$$NiCl_2 + H_2 = Ni + 2HCl$$

and a relative concentration of hydrogen chloride such that the square of the concentration of hydrogen chloride in the gas as introduced into said zone divided by the concentration of the hydrogen is less than the value of the ratio representing the equilibrium constant of the equation:

$$NiCl_2 + H_2 = Ni + 2HCl$$

and exceeds the value of the ratio representing the equilibrium constant of the equation:

$$FeCl_2 + H_2 = Fe + 2HCl$$

so as to block reduction of FeCl₂ initially and throughout the process, substantially continuously passing said reducing gas through said reducing zone in reactive contact with said mixture of solid materials, and substantially continuously withdrawing the unreacted portion of said reducing gas together with the gaseous reaction product of the reaction in said zone from reactive contact with said solid materials and from said reaction zone, whereby the nickel chloride is reduced to metallic nickel without the reduction of any substantial amount of the ferrous chloride to metallic iron.

2. The process defined in claim 1, wherein said reducing gas has a total pressure substantially equal to atmospheric pressure and consists essentially of 13.7% HCl by volume and the balance hydrogen, and the temperature in said zone is maintained at about 600° C.

References Cited in the file of this patent

UNITED STATES PATENTS

| Number | Name | Date |
| --- | --- | --- |
| 2,418,148 | Williams | Apr. 1, 1947 |

OTHER REFERENCES

"Reduction of Metallic Chlorides by Hydrogen," by A. B. Bagdasarian, Transactions of the American Electrochemical Society, vol. 51 (1927), pages 449–494.

"Comprehensive Treatise on Inorganic and Theoretical Chemistry," by Mellor, vol. 15 (1936), page 411.

Societe Chimique de France, Bulletin; vol. 35 (1924), pages 561 and 562.